No. 653,048. Patented July 3, 1900.
C. WIGG.
SUPPORT FOR RUBBER TIRED VEHICLE WHEELS.
(Application filed Dec. 13, 1899.)
(No Model.)
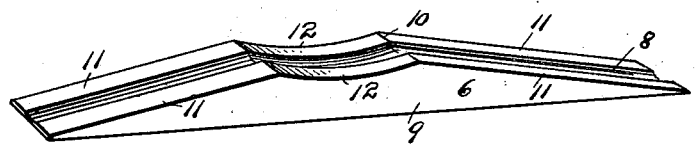
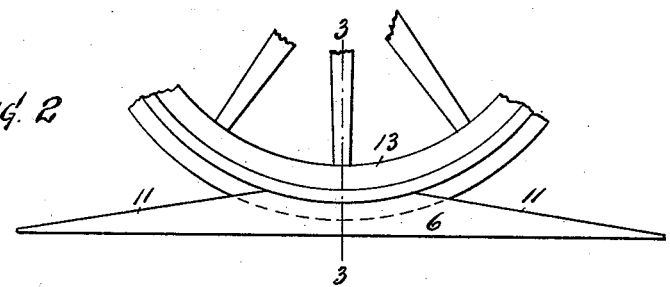
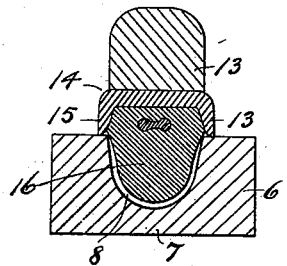
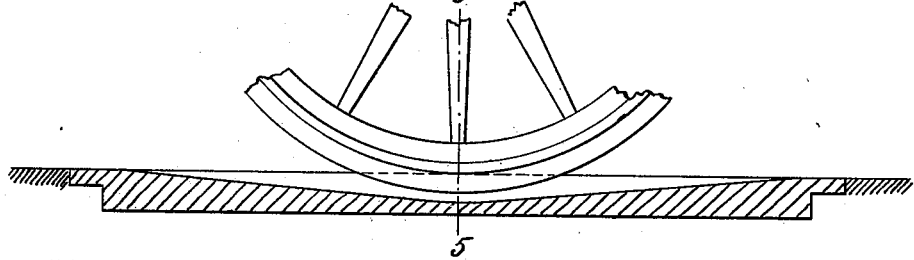
WITNESSES:
G. M. Howell
C. W. Stapleton
INVENTOR
Curtis Wigg
BY
Garry P. Van Wye
ATTORNEY

UNITED STATES PATENT OFFICE.

CURTIS WIGG, OF NEW YORK, N. Y.

SUPPORT FOR RUBBER-TIRED VEHICLE-WHEELS.

SPECIFICATION forming part of Letters Patent No. 653,048, dated July 3, 1900.

Application filed December 13, 1899. Serial No. 740,221. (No model.)

*To all whom it may concern:*

Be it known that I, CURTIS WIGG, a citizen of the United States, residing at New York, in the county and State of New York, have invented a new and useful Support for Rubber-Tired Vehicle-Wheels, of which the following is a specification.

My invention relates to improvements in supports for vehicle-wheels, and especially that class of vehicle-wheels using rubber tires; and the object thereof is to provide a support which will keep the weight of the vehicle and wheels off the rubber tire when the vehicle is not in use. I attain this object by the device illustrated in the accompanying drawings, in which—

Figure 1 is a perspective view of my improved support. Fig. 2 is a side elevation of my improved rest and a section of a wheel mounted thereon. Fig. 3 is a transverse sectional view on the line 3 3 of Fig. 2. Fig. 4 is a longitudinal sectional view of a modified form of construction, and Fig. 5 is a view on the line 5 5 of Fig. 4.

In the accompanying drawings the several parts of my improved device are indicated by numerals of reference, and in the practice of my invention I provide a block 6, having a flat bottom 7, and on the upper side is formed a longitudinal groove 8, whereby two ribs 9 and 10 are formed, each of which is cut away at the ends to form inclined planes 11 and is cut away centrally to form semicircular recesses 12. At 13 I have shown the felly of a wheel on which is mounted a rim 14, having side flanges 15, in which is mounted the tire 16.

In operation the wheel is run on the block at one end thereof, and the groove 8 is so proportioned in size that the rubber tire will not touch at any point except adjacent to the flanges 15 of the rim 14, so that the peripheries of the flanges 15 will contact with the inclined planes 11 at one end of the ribs 9 and 10 until the said tire is entirely free from contact with the walls of said groove, except as aforesaid, when the peripheries of the said flanges enter the said recesses 12 and the wheel is safely lodged on the support and the weight of the vehicle is entirely removed from the rubber tire. As aforesaid, the groove is so proportioned in size that when the wheel is resting on the flanges 15 the tire will not contact with the walls of the said groove except adjacent to the said flanges. This construction serves to guide the wheel into place and insures the weight being placed on both flanges.

In Figs. 4 and 5 I have shown a modified form of construction in which a block 6' is set in the floor 17 and the bottom wall of the groove 8' is inclined at the ends, as shown at 18 and 19, until it rises at each end flush with the floor and the flanges 15 rest upon the top of the block, as clearly shown, the groove being proportioned as before.

It will thus be seen that I have provided a very simple and efficient device for supporting a vehicle, so that no weight will come upon the rubber tire, and one that is very useful, for the reason that when a vehicle stands a long time unused the weight of the same is apt to flatten the tire and to otherwise injure the same.

It is evident that many changes can be made in the construction without departing from the spirit of my invention, such as making the ends of the ribs curved instead of inclined planes, making the recesses 12 V-shaped instead of semicircular or in omitting the recesses entirely, and in changing the shape of the bottom of the groove in the modified form of construction. It is also evident that if a cement or stone floor was used the groove 8' could be cut in the floor instead of using the block 6'. I therefore reserve the right to make all such changes.

Having thus described my invention, what I claim as new, and desire to secure by Letters Patent, is—

1. In a support for a rubber-tired vehicle-wheel, the same being provided with a groove, an inclined approach to the central part thereof from the level of the roadway, and supports on which the flanges of the rim rest, and the weight of the wheel and vehicle is sustained, for the purpose set forth.

2. In a support for a rubber-tired vehicle-wheel, a block provided with a groove, an inclined approach to the center thereof from the level of the roadway, said groove being so proportioned in width that when a wheel is mounted therein, the flanges of the rim will engage the top of the block and the tire will be sustained substantially free from contact with the walls of said groove, for the purpose set forth.

3. A support for a rubber-tired vehicle-wheel, consisting of a block having a longitudinal groove in the upper side thereof whereby two ribs are formed, said ribs being cut away at the ends to form inclined planes, and said groove being so proportioned in size that the weight of the wheel and vehicle will be sustained by said ribs in conjunction with the flanges of the rim, substantially as and for the purpose set forth.

4. The herein-described support for rubber-tired vehicle-wheels, consisting of a block 6, having flat bottom 7, groove, 8, ribs 9, and 10, with inclined ends 11, and recesses 12, substantially as and for the purpose set forth.

In testimony whereof I have signed my name to this specification in the presence of two subscribing witnesses.

CURTIS WIGG.

Witnesses:
O. W. STAPLETON,
ROBERT F. WARK.